(12) United States Patent
Bush et al.

(10) Patent No.: US 9,667,956 B2
(45) Date of Patent: May 30, 2017

(54) ICON-BASED HOME CERTIFICATION, IN-HOME LEAKAGE TESTING, AND ANTENNA MATCHING PAD

(71) Applicant: TRILITHIC, INC., Indianapolis, IN (US)

(72) Inventors: Terry W. Bush, Greenwood, IN (US); John Joseph Bush, Bargersville, IN (US); Dexin Sun, Indianapolis, IN (US)

( * ) Notice: Subject to any disclaimer, the term of this patent is extended or adjusted under 35 U.S.C. 154(b) by 0 days.

(21) Appl. No.: 14/435,628

(22) PCT Filed: Oct. 15, 2013

(86) PCT No.: PCT/US2013/064993
§ 371 (c)(1),
(2) Date: Apr. 14, 2015

(87) PCT Pub. No.: WO2014/062649
PCT Pub. Date: Apr. 24, 2014

(65) Prior Publication Data
US 2015/0264343 A1    Sep. 17, 2015

Related U.S. Application Data

(60) Provisional application No. 61/713,707, filed on Oct. 15, 2012, provisional application No. 61/807,046, (Continued)

(51) Int. Cl.
*H04N 7/173* (2011.01)
*H04N 17/00* (2006.01)
(Continued)

(52) U.S. Cl.
CPC .......... *H04N 17/004* (2013.01); *H04H 20/12* (2013.01); *H04H 20/78* (2013.01); *H04L 12/413* (2013.01);
(Continued)

(58) Field of Classification Search
CPC .. H04N 17/004; H04N 17/10; H04N 21/6168; H04N 21/6118; H04N 21/6582; H04N 17/00; H04N 7/102; H04N 7/173; H04N 7/17309; H04H 20/12; H04H 20/78; H04H 60/97
(Continued)

(56) References Cited

U.S. PATENT DOCUMENTS 4,072,899 A    2/1978  Shimp
5,493,210 A    2/1996  Orndorff et al.
(Continued)

FOREIGN PATENT DOCUMENTS

WO    WO2013/003301    1/2013

OTHER PUBLICATIONS

PCT Search Report and Written Opinion for PCT/US2013/064993, completed May 13, 2014.

*Primary Examiner* — An Son P Huynh
(74) *Attorney, Agent, or Firm* — Barnes & Thornburg LLP

(57) ABSTRACT

A method for determining the magnitude of leakage in a subscriber's premises CATV installation; a frequency multiplexer for coupling between an antenna and a receiver for the multiplexed frequencies; and, a method for a technician to certify a CATV subscriber's premises for the provision of CATV services are disclosed.

9 Claims, 18 Drawing Sheets

Related U.S. Application Data filed on Apr. 1, 2013, provisional application No. 61/823,966, filed on May 16, 2013, provisional application No. 61/862,716, filed on Aug. 6, 2013.

(51) Int. Cl.
  *H04N 21/442* (2011.01)
  *H04N 21/61* (2011.01)
  *H04L 12/413* (2006.01)
  *H04H 20/12* (2008.01)
  *H04H 20/78* (2008.01)
  *H04N 7/10* (2006.01)

(52) U.S. Cl.
  CPC ......... *H04N 7/17309* (2013.01); *H04N 17/00* (2013.01); *H04N 21/44209* (2013.01); *H04N 21/6118* (2013.01); *H04N 21/6168* (2013.01); *H04N 7/106* (2013.01)

(58) Field of Classification Search
  USPC .......................................... 725/107, 124–125
  See application file for complete search history.

(56) References Cited

U.S. PATENT DOCUMENTS

| | | | |
|---|---|---|---|
| 5,608,428 A | 3/1997 | Bush | |
| 5,982,165 A * | 11/1999 | Bowyer | G01R 19/0007 324/509 |
| 6,018,358 A | 1/2000 | Bush | |
| 6,112,059 A * | 8/2000 | Schwent | H03F 3/1935 455/67.11 |
| 6,310,646 B1 * | 10/2001 | Shi | H04N 17/00 324/95 |
| 6,425,132 B1 * | 7/2002 | Chappell | H04N 7/17309 324/500 |
| 6,611,150 B1 * | 8/2003 | Stevens | G01R 31/025 324/613 |
| 6,804,826 B1 | 10/2004 | Bush et al. | |
| 6,833,859 B1 | 12/2004 | Schneider et al. | |
| 6,877,166 B1 * | 4/2005 | Roeck | H04N 7/17309 348/E7.07 |
| 8,143,900 B2 * | 3/2012 | Shimp | G01R 29/0828 324/527 |
| 8,146,125 B2 * | 3/2012 | Grinkemeyer | H04H 20/12 348/180 |
| 8,161,517 B2 | 4/2012 | Bowen et al. | |
| 8,239,903 B1 * | 8/2012 | Campagna | H04N 21/4433 725/100 |
| 8,650,605 B2 * | 2/2014 | Zinevich | H04N 21/44209 348/180 |
| 8,811,148 B2 * | 8/2014 | Yang | H04L 41/5067 370/216 |
| 8,869,223 B2 * | 10/2014 | Menna | H01P 3/081 174/382 |
| 2002/0095686 A1 * | 7/2002 | Shi | H04N 17/00 725/107 |
| 2003/0022645 A1 | 1/2003 | Runzo | |
| 2003/0033609 A1 * | 2/2003 | Zimmerman | H04N 17/00 725/125 |
| 2005/0034170 A1 * | 2/2005 | Bush | H04N 7/088 725/135 |
| 2008/0040764 A1 * | 2/2008 | Weinstein | H04N 7/102 725/119 |
| 2010/0266000 A1 | 10/2010 | Froimovich et al. | |
| 2011/0267474 A1 * | 11/2011 | Sala | H04N 17/00 348/180 |
| 2012/0257661 A1 | 10/2012 | Murphy et al. | |
| 2014/0047489 A1 * | 2/2014 | Nielsen | H04B 3/50 725/107 |

* cited by examiner

Created Jobs

Job Management

| Name | Status | Tests | Channel Plan |
|---|---|---|---|
| w20120928185437 | Open | 0 | Standard |
| w20120928185503 | Open | 0 | Standard - East |
| w20120928185522 | Open | 0 | Standard - North |
| w20120928185528 | Open | 0 | Standard - South |
| w20120928185538 | Open | 0 | Standard - West |
| w20120928185545 | Open | 0 | Standard - Central |

| Name | Open | Close | Delete |

Fig. 2

Tap Test Completed

Tap | Ingress 🚫 | Levels ❌ | DOCSIS ✓

Pass @ DigitalLevel @ 801.000 MHz @ 14.5 dBmV
Pass @ DigitalLevel @ 807.000 MHz @ 14.2 dBmV
Pass @ VideoLevel @ 813.000 MHz @ 14.6 dBmV
Pass @ VideoLevel @ 819.000 @ MHz 14.8 dBmV
Pass @ VideoLevel @ 16.900 @ MHz 32.4 dBmV
Pass @ VideoLevel @ 24.000 @ MHz 31.2 dBmV
Pass @ VideoLevel @ 31.100 @ MHz 32.4 dBmV
Pass @ VideoLevel @ 39.800 @ MHz 31.7 dBmV
Done Autotest Complete | Done

Fig. 5

Closed Jobs

Job Management

| Name | Status | Tests | Channel Plan |
|---|---|---|---|
| w20120928185503 | Open | 0 | Standard - East |
| w20120928185522 | Open | 0 | Standard - North |
| w20120928185528 | Open | 0 | Standard - South |
| w20120928185538 | Open | 0 | Standard - West |
| w20120928185437 | Closed | 0 | Standard |
| w20120928185545 | Closed | 0 | Standard - Central |

Job is already Open

| Name | Open | Close | Delete |

ICON-BASED HOME CERTIFICATION, IN-HOME LEAKAGE TESTING, AND ANTENNA MATCHING PAD

CROSS REFERENCE TO RELATED APPLICATIONS

This application is a national stage entry under 35 USC §371(b) of International Application No. PCT/US2013/064993, filed Oct. 15, 2013, which claims the benefit under 35 U.S.C. §119(e) of U.S. Ser. No. 61/713,707 filed Oct. 15, 2012, U.S. Ser. No. 61/807,046 filed Apr. 1, 2013, 61/823,966 filed May 16, 2013, and 61/862,716 filed Aug. 6, 2013. The disclosures of U.S. Ser. No. 61/713,707, U.S. Ser. No. 61/807,046, U.S. Ser. No. 61/823,966, and U.S. Ser. No. 61/862,716 are hereby incorporated herein by reference.

Currently, in the CATV, (hereinafter sometimes cable), industry, technicians perform a series of tests at multiple points in a subscriber location before an installation is deemed "Quality" or "Clean." This process is known as certification. It creates what is known as a "birth certificate" for the subscriber premises. The management of a multi-system operator (hereinafter sometimes MSG) or smaller cable system operator identifies certain system performance limits that must be passed in order to certify the subscriber location as ready for connection to the system. As an example, the operator's home certification program might require the operator's installation and service technicians to run tests at different points in the distribution circuit at the subscriber's location (for example, home, apartment building, or place of business) in a certain order with certain limits on the test results at each point.

Another problem is with cable systems switching to digital. Leakage from analog cable channels is readily detected by systems, generally referred to as "taggers," of the general types illustrated in, for example, U.S. Pat. Nos. 5,608,428; 6,018,358; 6,804,826, and references cited therein. The disclosures of these references are hereby incorporated herein by reference. This listing is not intended to be a representation that a complete search of all relevant art has been made, or that no more pertinent art than that listed exists, or that the listed art is material to patentability. Nor should any such representation be inferred.

However, distinct from an analog channel, a digital channel signal is spread fairly uniformly over 6 MHz. As a result, there is too little "tag" signal power in any sample, or "slice," of the 6 MHz digital signal to reliably render the tag signal detectable.

A solution to this problem of tagging digital signals is to put a single frequency tag signal in the gap between adjacent 6 MHz digital channels and then monitor the gap in an effort to detect the tag. If the tag is detected, the operator has detected a leak. An enhancement puts multiple, for example, two, tag signals in the gap at multiple, for example, two, frequencies spaced far enough apart to discriminate between them. The operator looks for both/all of the inserted signals in order to detect a leak. The use of multiple tag signals at multiple different frequencies is useful where, for example, systems are overbuilt. Examples of these and similar techniques are described in, for example, PCT publication WO 2013/003301. Again, the disclosure of this reference is hereby incorporated herein by reference. This listing is not intended as a representation that a complete search of all relevant art has been made, or that no more pertinent art than that listed exists, or that the listed art is material to patentability. Nor should any such representation be inferred.

SUMMARY

A method for determining the magnitude of leakage in a subscriber's premises CATV installation comprises disconnecting the network at a suitable network port, coupling a frequency source to the port so that a high power offset is maintained, shielding the frequency source to prevent a signal level meter or leakage receiver from receiving radiated frequency source oscillations, transporting a signal level meter or leakage receiver around the premises, and logging signal levels measured by the signal level meter or leakage receiver as the signal level meter or leakage receiver is transported.

Illustratively, the method further comprises addressing excessive signal levels thus logged.

Illustratively, disconnecting the network at a suitable network port comprises disconnecting the network at the subscriber's premises ground block.

Illustratively, coupling a frequency source to the port comprises coupling a dual oscillator to the port.

Illustratively, coupling a coupling a frequency source to the port so that a high power offset is maintained comprises coupling a dual oscillator to the port at a level in the range of about 40 dB to about 70 dB above the level provided by the network.

Illustratively, logging signal levels measured by the signal level meter or leakage receiver as the signal level meter or leakage receiver is transported comprises calculating $G_T$ from the equation $$P_R = P_T - L_L + G_T - L_{fs} + G_R$$

where $P_R$=received power in dBmV;
$P_T$=transmitted power in dBmV;
$L_L$=line loss in the port and the subscriber's premises's internal cabling;
$G_T$=gain in dBi of the transmitting antenna;
$L_{fs}$=loss in dB attributable to the space between the leak and the receiving antenna; and,
$G_R$=gain in dBi of the receiving antenna.

Further illustratively, the method comprises analyzing the measurement to ascertain the location and extent of the leak.

Further illustratively, the method comprises generating a work order to repair the leak responsible for the calculated $G_T$.

Further illustratively, the method comprises analyzing the measurement to ascertain the likelihood of interference from the premises entering the CATV system through the leak responsible for the calculated $G_T$ and disrupting other CATV services.

Further illustratively, the method comprises analyzing the measurement to ascertain isolation between the CATV system and the premises.

Further illustratively, the method comprises providing the measurement to (a) server(s) operated by the CATV system operator, or to whose services the CATV system operator subscribes, and entering the measurement into the subscriber's file, along with the time(s) the measurements) was/were made, subscriber location/identity, and information about whether, and if so, when, a work order was filled.

Further illustratively, the method comprises entering the measurement into a management information base and generating from the management information base an alert concerning the status of one or more components or functions of the CATV plant.

Further illustratively, the method comprises subtracting the power offset from the signal level, converting the result to a field strength and displaying the resulting field strength on, for example, a display associated with the signal level meter or leakage receiver.

A frequency multiplexer is provided for coupling between an antenna and a receiver for the multiplexed frequencies. The multiplexer divides a received frequency spectrum into at least a low band and a high band. The multiplexer includes a low pass filter for passing the low band from the antenna to the receiver and a high pass filter for passing the high band from the antenna to the receiver. The LPF and HPF are coupled in parallel between an output port of the antenna and an input port of the receiver.

Illustratively, the LPF comprises first and second inductances coupled in series between the output port and the input port, and a first capacitance coupled between the junction of the first and second inductances and the receiver ground. The HPF comprises second and third capacitances coupled in series between the output port and the input port and a third inductance coupled between the junction of the second and third capacitances and the receiver ground.

Further illustratively, the multiplexer comprises an antenna impedance matching network coupled between the output port and the LPF.

A method for a technician to certify a CATV subscriber's premises for the provision of CATV services comprises: (a) locating the CATV tap at the subscriber's premises; (b) coupling a certification instrument to the tap; (c) displaying on a display associated with the certification instrument a screen or image or picture or icon of a first test of the certification process; (d) executing the first test of the certification process, the display then advising the technician if the subscriber's premises passes or fails the first test; (e) displaying on the display a screen or image or picture or icon notifying the technician what test the technician needs to perform next; (f) executing the next test, the display then advising the technician if the subscriber's premises passes or fails the next test; (g) repeating steps (e) and (f) for as many additional tests as are necessary to complete the certification process; and, (h) transmitting certification testing results to a server maintained for this purpose.

Further illustratively, the method comprises: before step (a) issuing a certification work order; and, after step (g) closing out the certification work order.

BRIEF DESCRIPTION OF THE DRAWINGS

The invention may best be understood by referring to the following detailed description and accompanying drawings which illustrate the invention. In the drawings:

FIGS. 1-8 illustrate steps of a screen- or image- or picture- or icon-guided process to be followed by a technician to perform a subscriber's premises certification of a CATV system connection;

DETAILED DESCRIPTIONS OF ILLUSTRATIVE EMBODIMENTS

Figure 1:
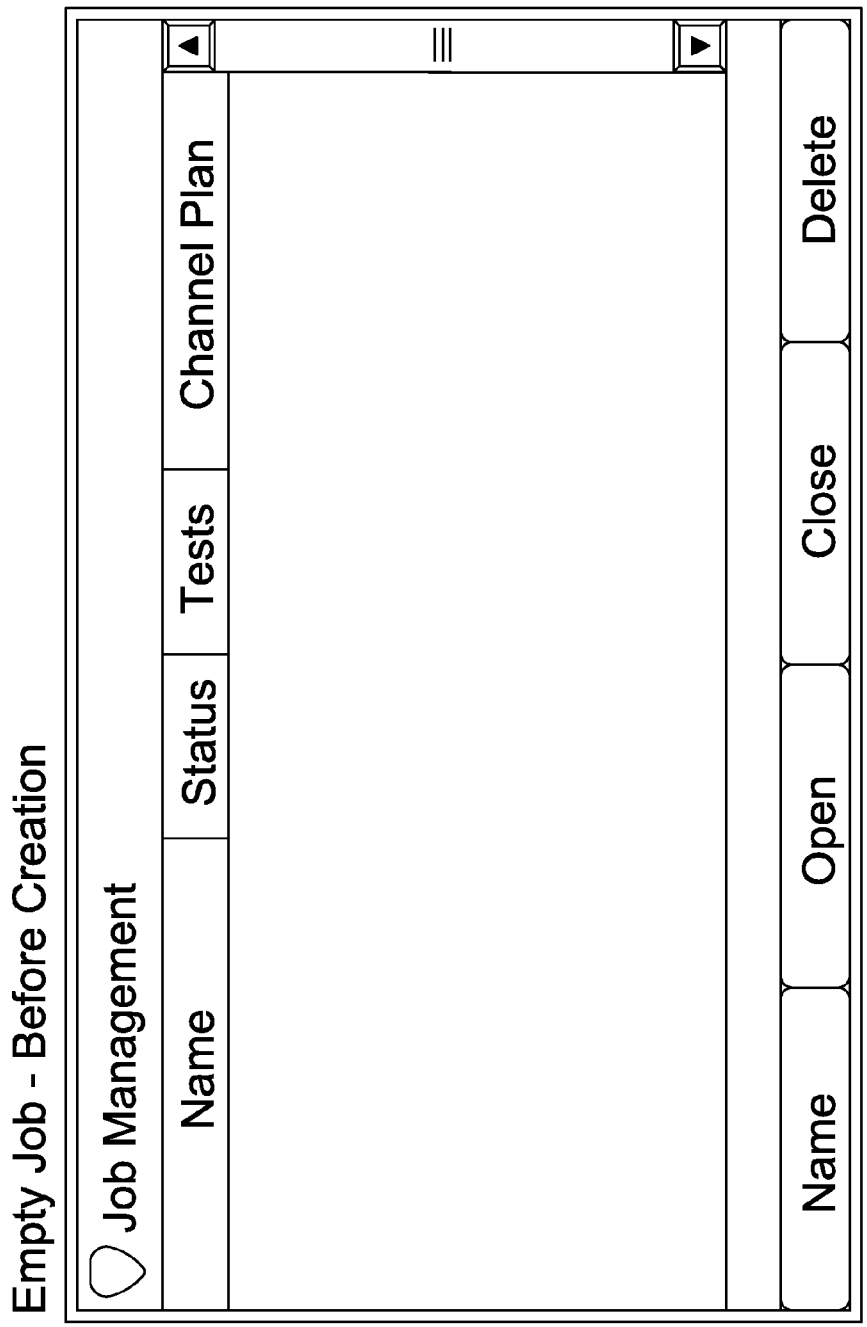
Figure 3:
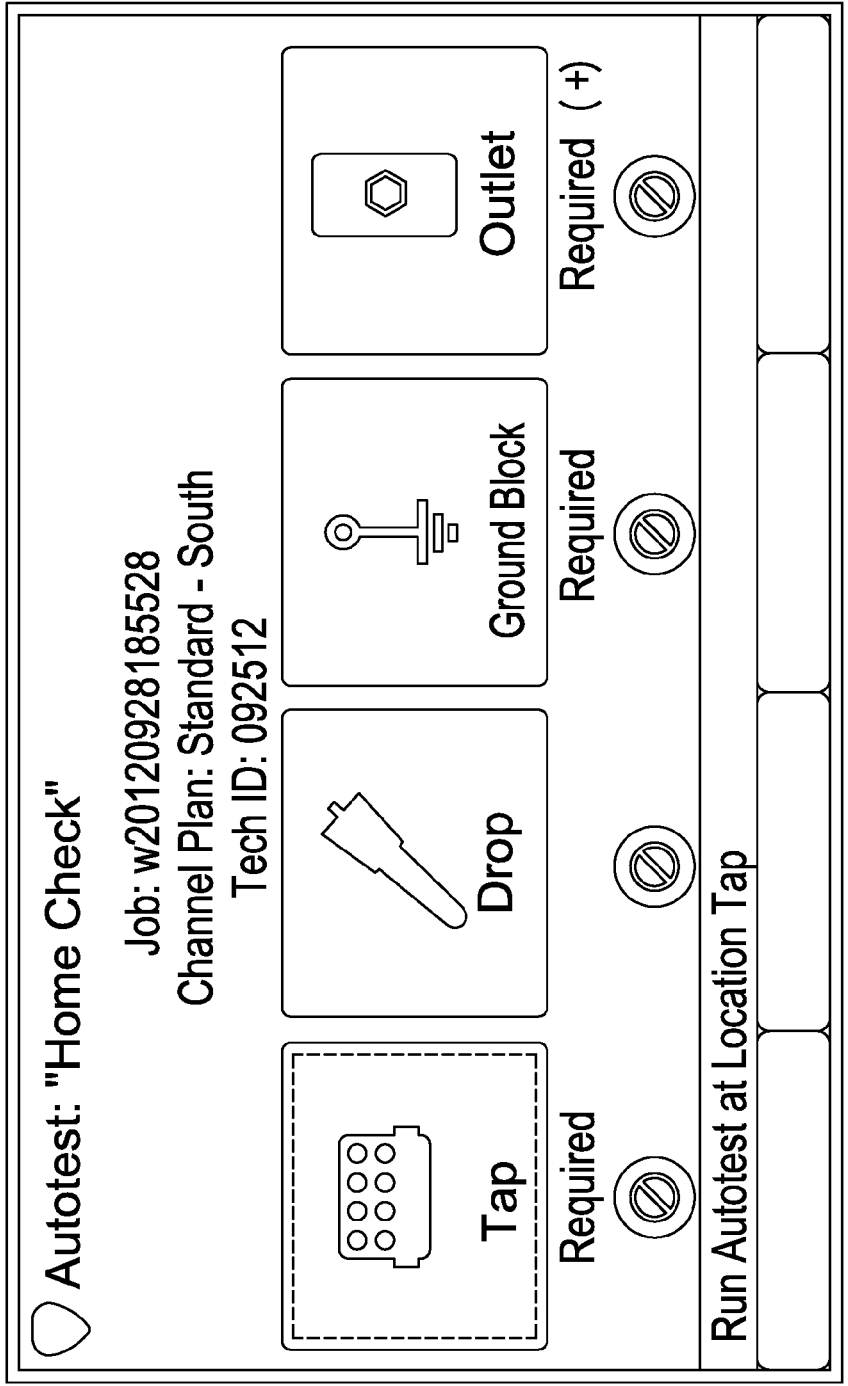
Figure 4:
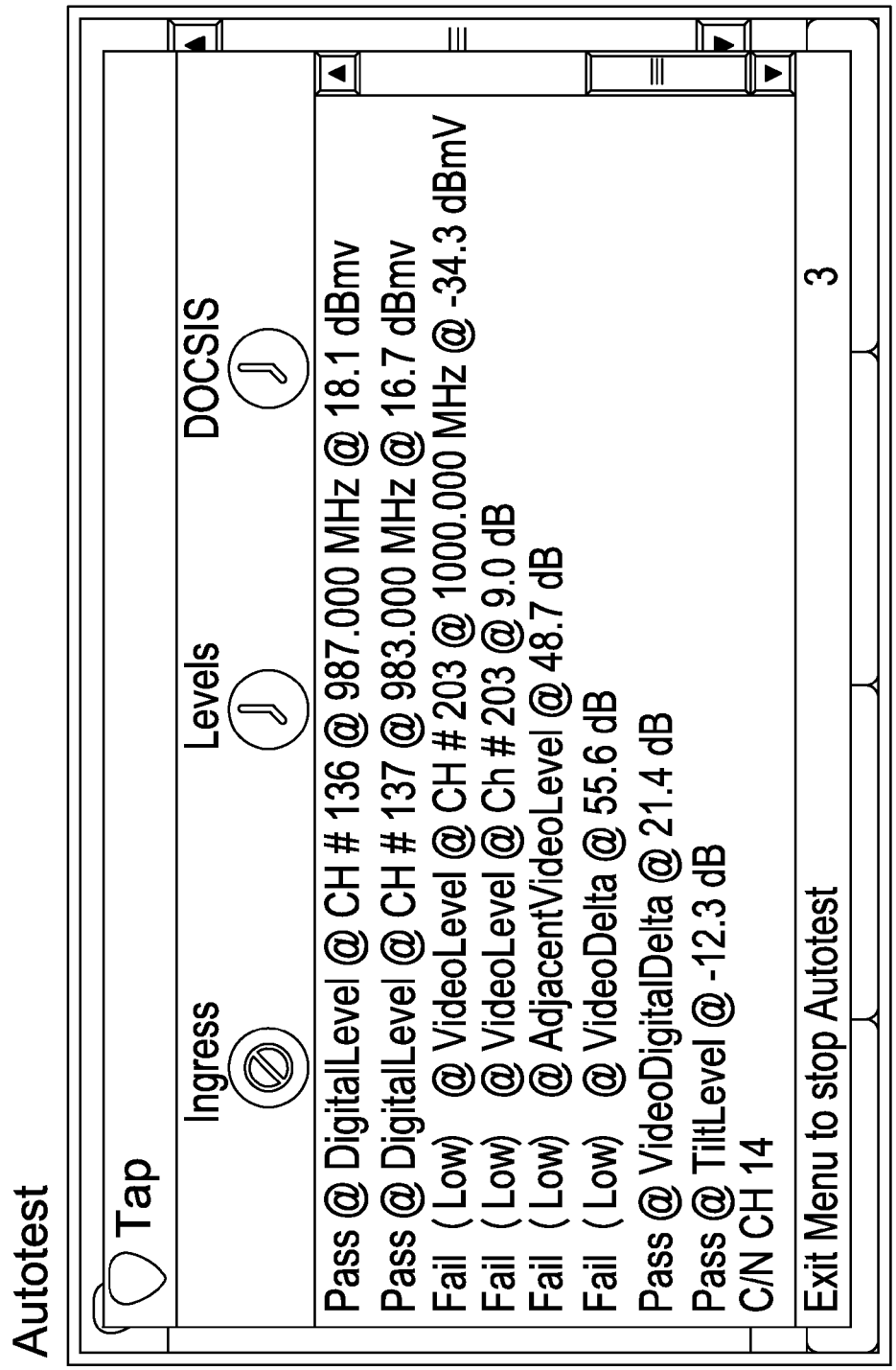
Figure 6:
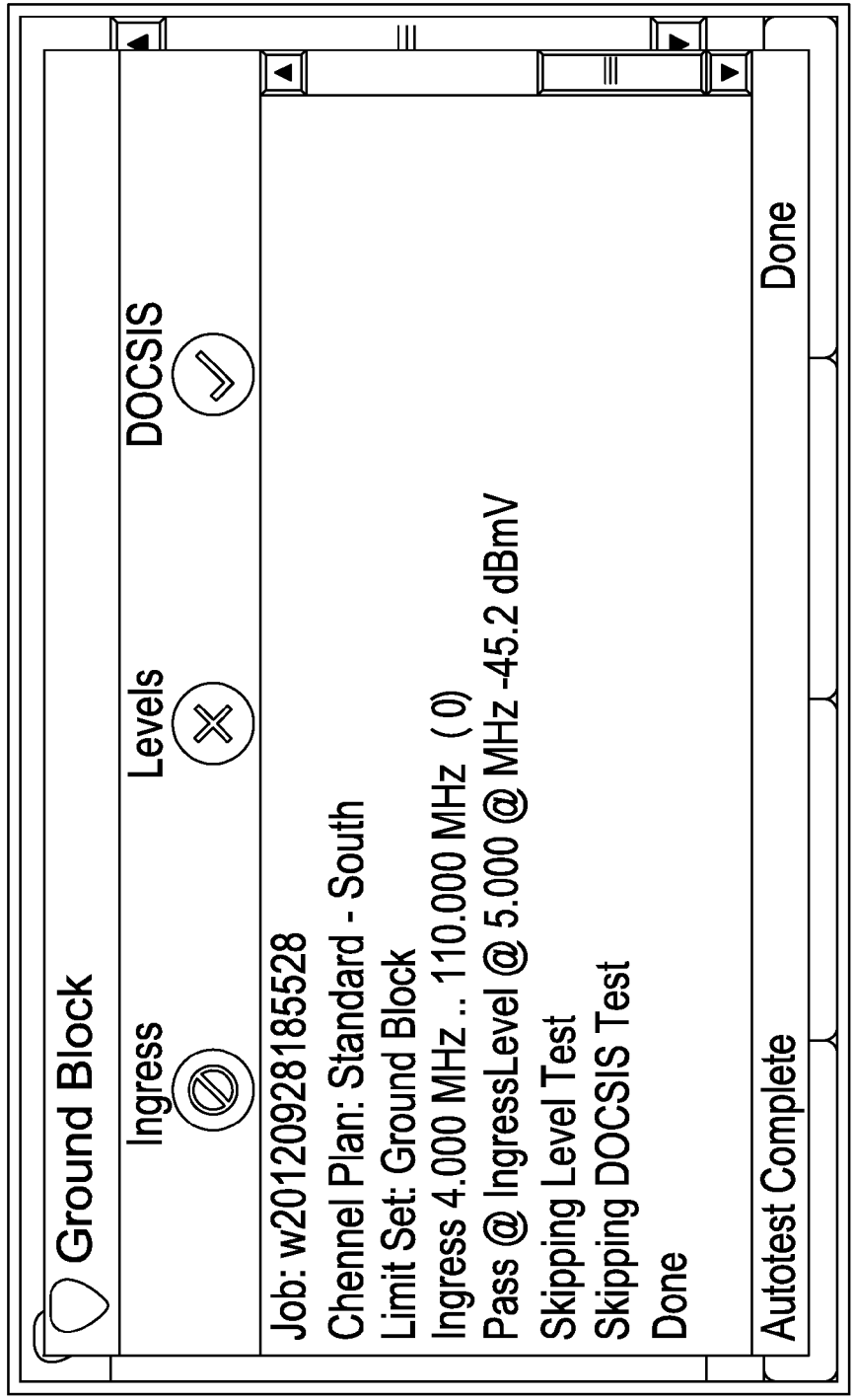
Figure 7:
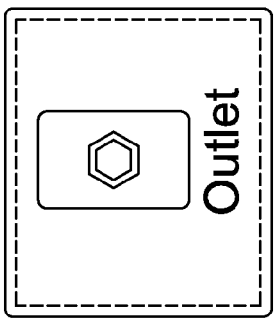

In subscriber premises certifications, currently most operators issue certification work orders, FIGS. 1, 2. The technician arrives at the premises, certification of which is sought, locates the tap and executes the "Tap" macro, FIGS. 3-5, of the screen- or image- or picture- or icon-guided process of the invention. Once this step is complete the screen- or image- or picture- or icon-guided process advises the technician if the tap passes of fails, FIGS. 5-7. At this time, the screen- or image- or picture- or icon-guided process also notifies the technician what test the technician needs to perform next. For example, the screen- or image- or picture- or icon-guided process may require the technician to move on to the cable drop and perform the "Drop" test measurements there, using the limits set for the "Drop." Again, once this step is complete the screen- or image- or picture- or icon-guided process advises the technician if the drop passes or fails. At this time, the screen- or image- or picture- or icon-guided process also notifies the technician what test the technician needs to perform next. For example, the screen- or image- or picture- or icon-guided process may require the technician to move inside the subscriber's premises to the cable outlet(s) or customer premises equipment (CPE), and perform the autotest there, FIG. 7. Once these tests of the screen- or image- or picture- or icon-guided process are performed, the results are graded against the limits set for the outlet(s) or CPE. The technician then moves on to the final test at the ground block (hereinafter sometimes GB), FIG. 6. Once the GB test is complete and the installation meets all the requirements, the technician is directed to close out the job and transmit the completed test documentation up to the server for system management purposes, FIGS. 7-8.

There are currently basically two available types of leakage gear. So-called "truck-mounted" units are mounted in vehicles that are driven along the cable plant, generally by maintenance/service technicians to monitor leakage along the cable. These systems are generally quite sophisticated and, as a result, expensive, costing in the range of $3000 or more.

Figure 9:
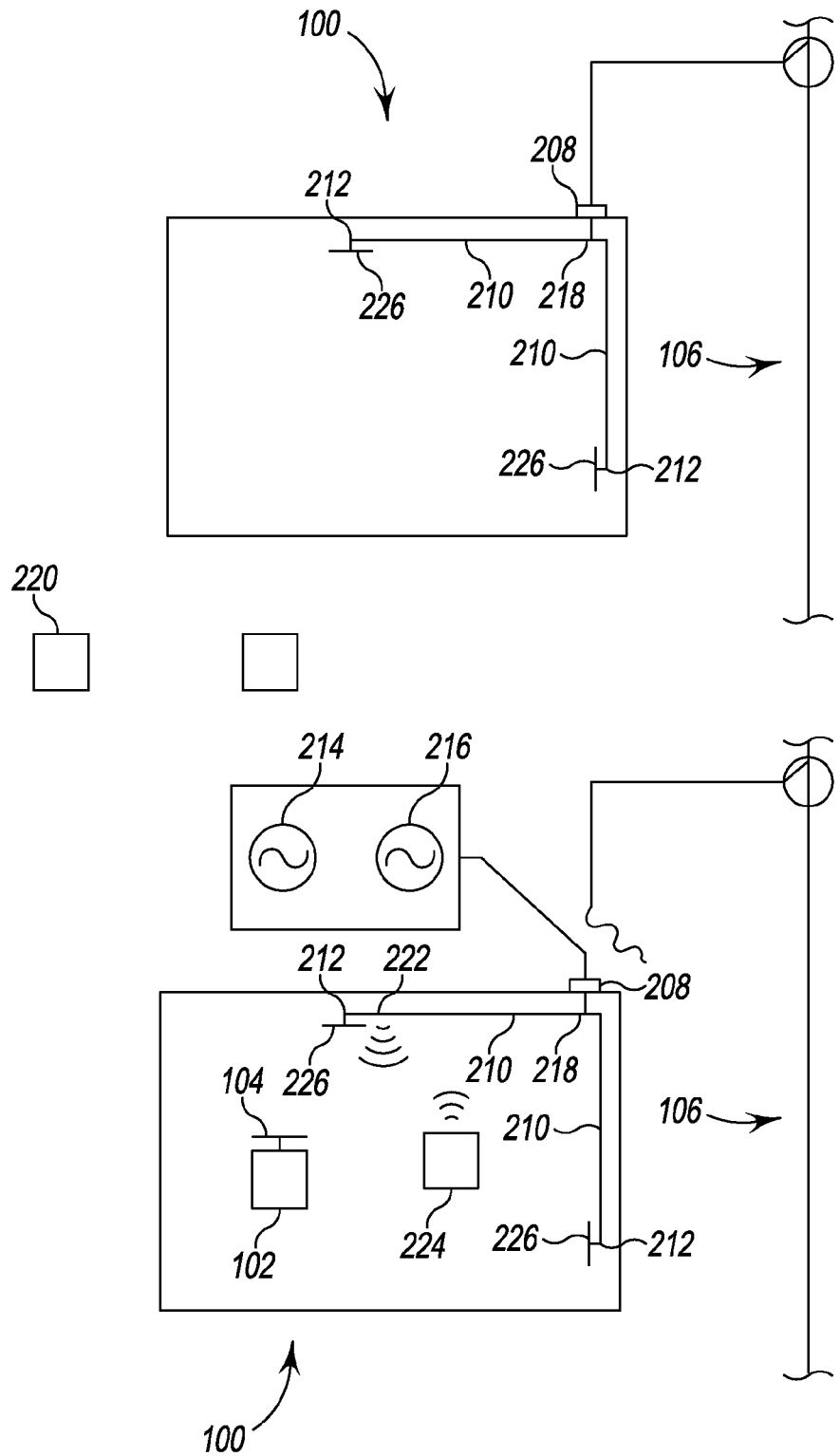
FIG. 9 illustrates a method and apparatus for performing a subscriber's premises certification; and, FIGS. 10-18 illustrate a component useful with other equipment for performing a subscriber's premises certification, and plots of performance characteristics of the illustrated component.

With reference to FIG. 9, the second type of leakage gear is the type given to technicians who come into subscribers' facilities 100 to hook up cable service and check connections initially. As a part of their installation process, sometime during the installation process the technicians walk around the house 100 with usually a fairly simple signal level meter (hereinafter sometimes SLM) 192 with an antenna 104 designed to receive signals in the cable 106 bandwidth. The presence of a signal in excess of a threshold is cause for further investigation that the cable 106 installation in the subscribers' premises 100 may have a flaw that could result in egress of downstream-bound signal from the cable system or, perhaps equally as importantly, ingress of signal from the premises 100 into the cable system in the upstream-bound "return band." The SLM 102/antenna 104 combination is rather less sophisticated, and, as a result, rather less expensive, typically costing in the $300-$600 range. At this price point, technicians can be equipped with the SLM 102/antenna 104 combination to check subscribers' premises 100 for leaks during an installation.

In-premises leakage mitigation is very important to the successful operation of a cable system with modern, high speed cable services. In-premises is part of the system that is not under direct control of the cable operator. As a result things can and will happen, such as emissions and ingress, that can have a direct effect on the cable quality of service. Further, there are many new products, such as cell phones and cell-equipped tablets, which populate the premises which are sources of ingress and which can thus disrupt or degrade the quality of video of data.

The cable industry is always concerned about leakage from the cable plant. Up until a few years ago, the industry was mostly interested in the aeronautical band (about 138 MHz). More recently, with the cell phone providers' introduction of 4G, the cable industry has also become concerned with the LTE band (about 750 MHz). For example, the Trilithic Seeker™ D instrument has the capability to monitor both of these bands using a diplexer (one combined output, two frequency separated inputs). This diplexer has a low band input in the range of about 138 MHz and a high band input in the range of about 750 MHz. This permits a vehicle to have two external antennas, one tuned to about 138 MHz and the other tuned to about 750 MHz, with their outputs combined through the diplexer and then input to an SLM in the truck.

However, when the technician takes his leakage measuring instrument from the truck's mobile mount, the instrument is disconnected from the diplexer and dual antennas. While a portable duplexer with two antennas is not out of the question, this combination including the SLM, diplexer and two antennas, will be somewhat awkward for the technician to walk around with, and somewhat difficult to use. In any attempt to use only one antenna to receive both frequencies, the mismatched frequency will be almost undetectable due to impedance mismatch loss and reflections. With reference to FIGS. 10-18, the illustrated antenna multiplexer permits a single antenna tuned for one frequency to work well at both frequencies. This antenna multiplexing concept is readily adaptable to three, four, or more, frequencies.

The illustrated antenna multiplexer has a single input and a single output. The signal combining and matching networks are internal to the multiplexer. The different matching networks for each frequency of interest are combined in the multiplexer.

A monopole antenna matching pad (hereinafter sometimes MAMP, multiplexer or diplexer) 130 couples a monopole (rubber duck) antenna 104 for receiving dual frequency leakage signal to a receiver meter or SLM 102. The MAMP 130 is connected to the antenna 104 at a BMC (female) port 132, and to the receiver meter or SLM 102 at a BNC/F (male) port 134. The resonant frequency of the antenna 104 is in the range of the upper frequency of interest here about 750 MHz.

Figure 10:
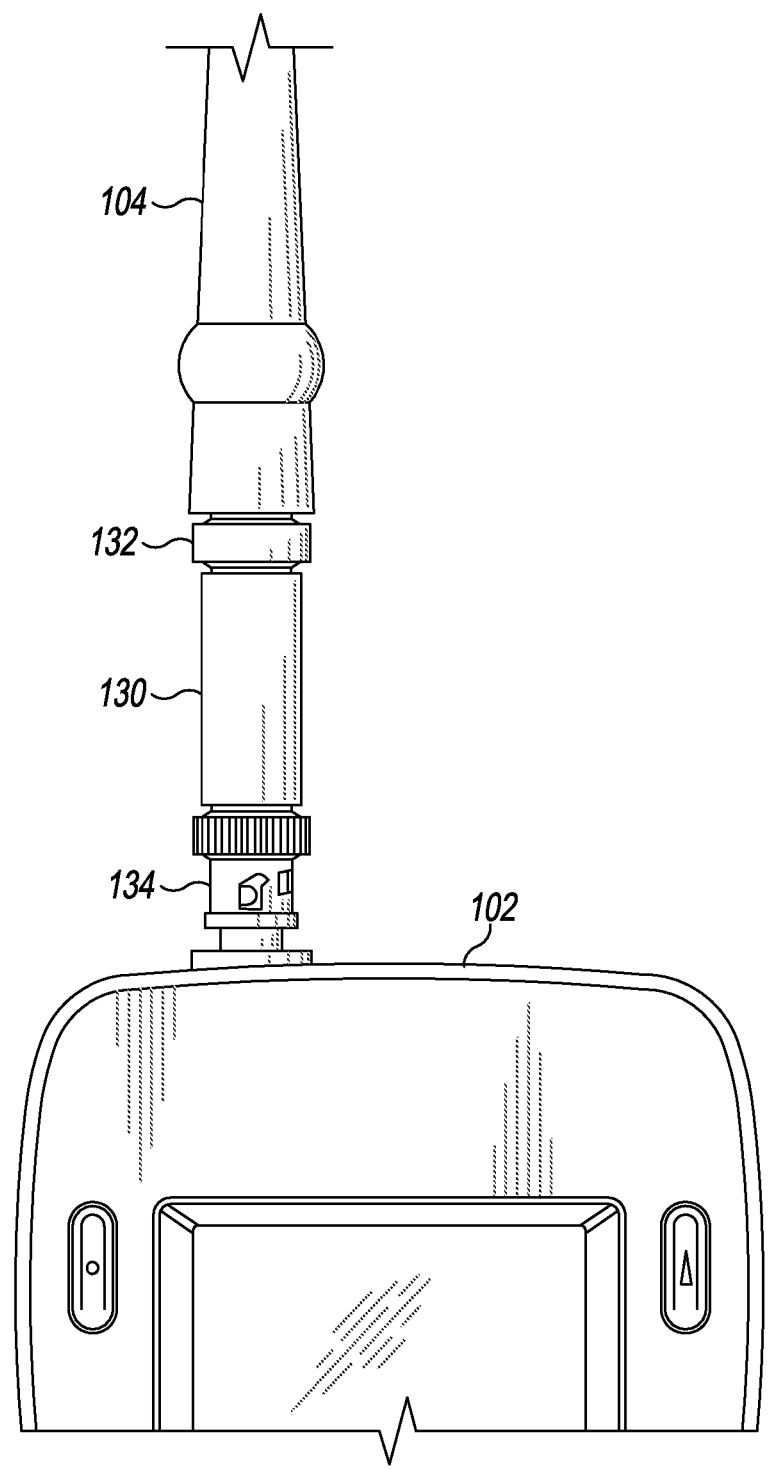
Figure 11:
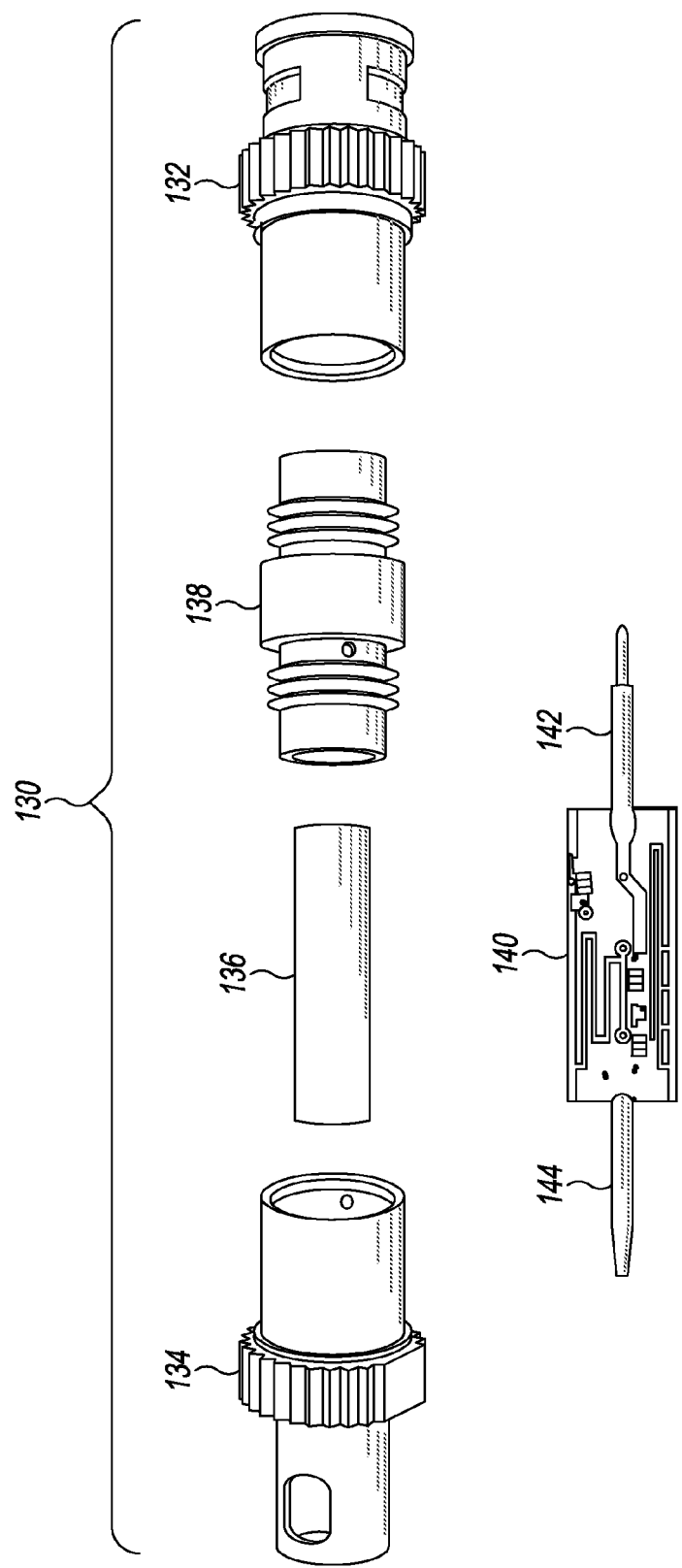
Figure 12:
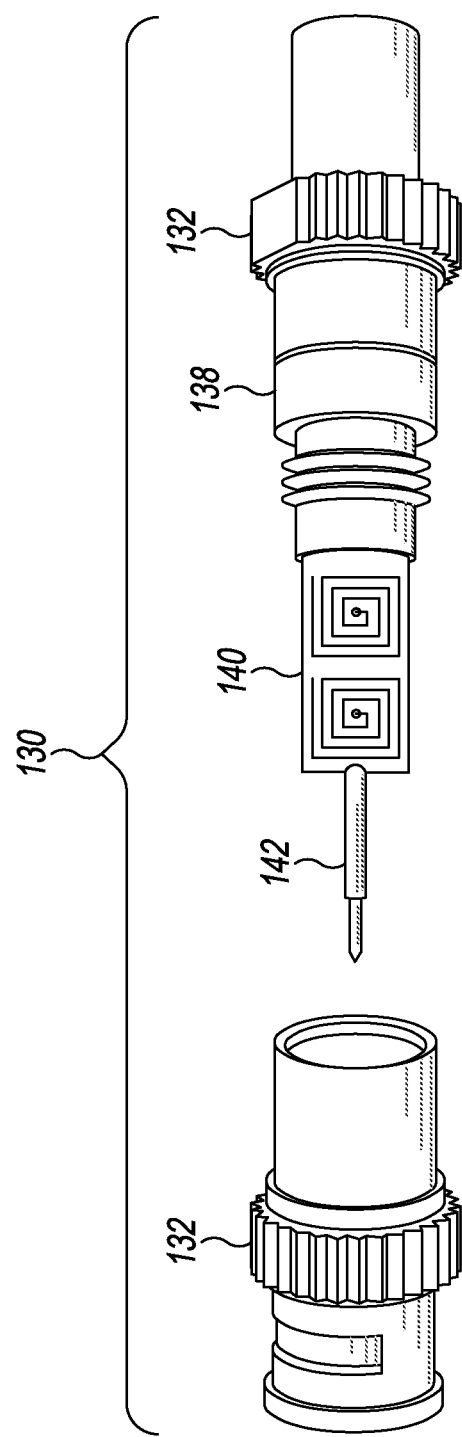
Figure 13:
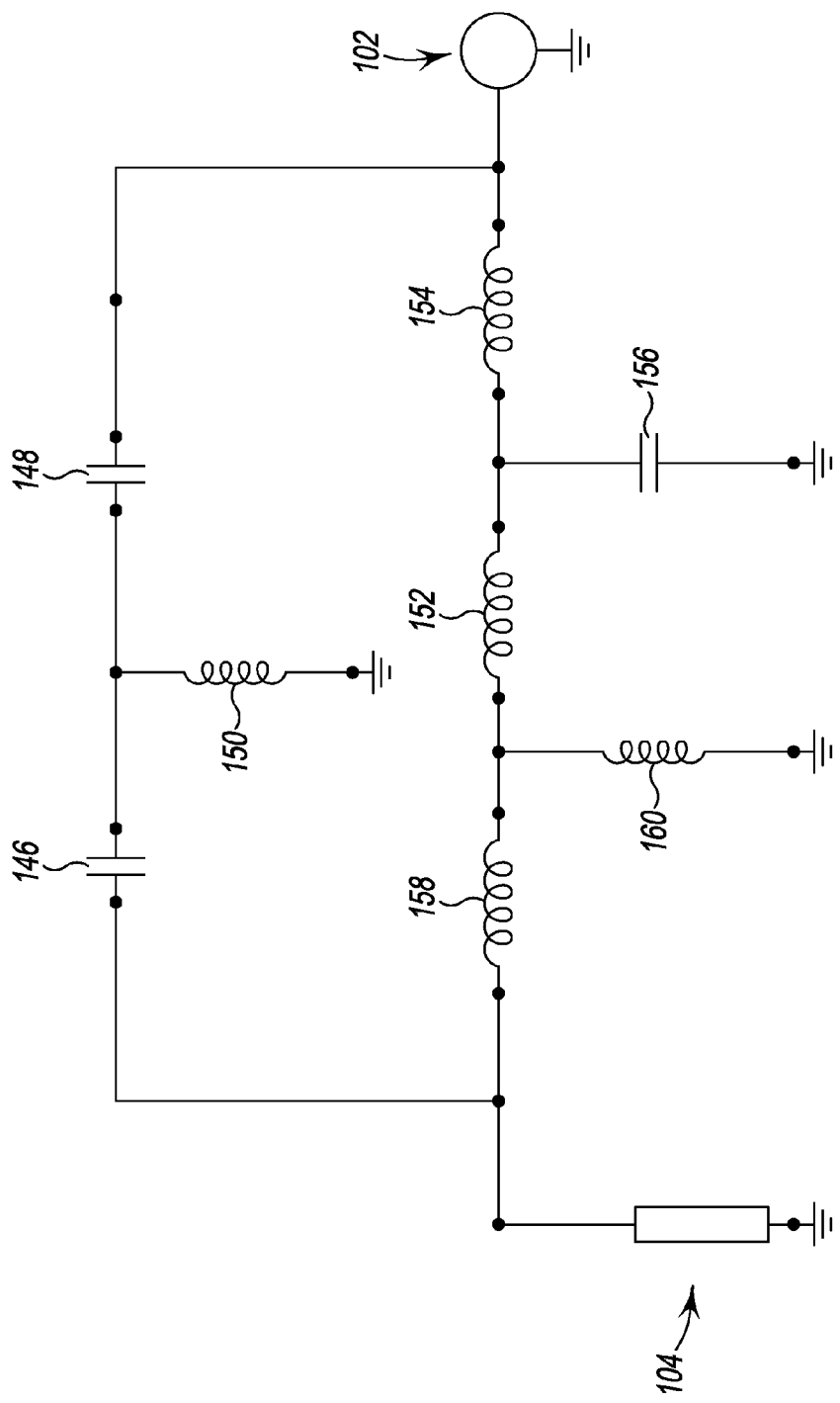
Figure 14:
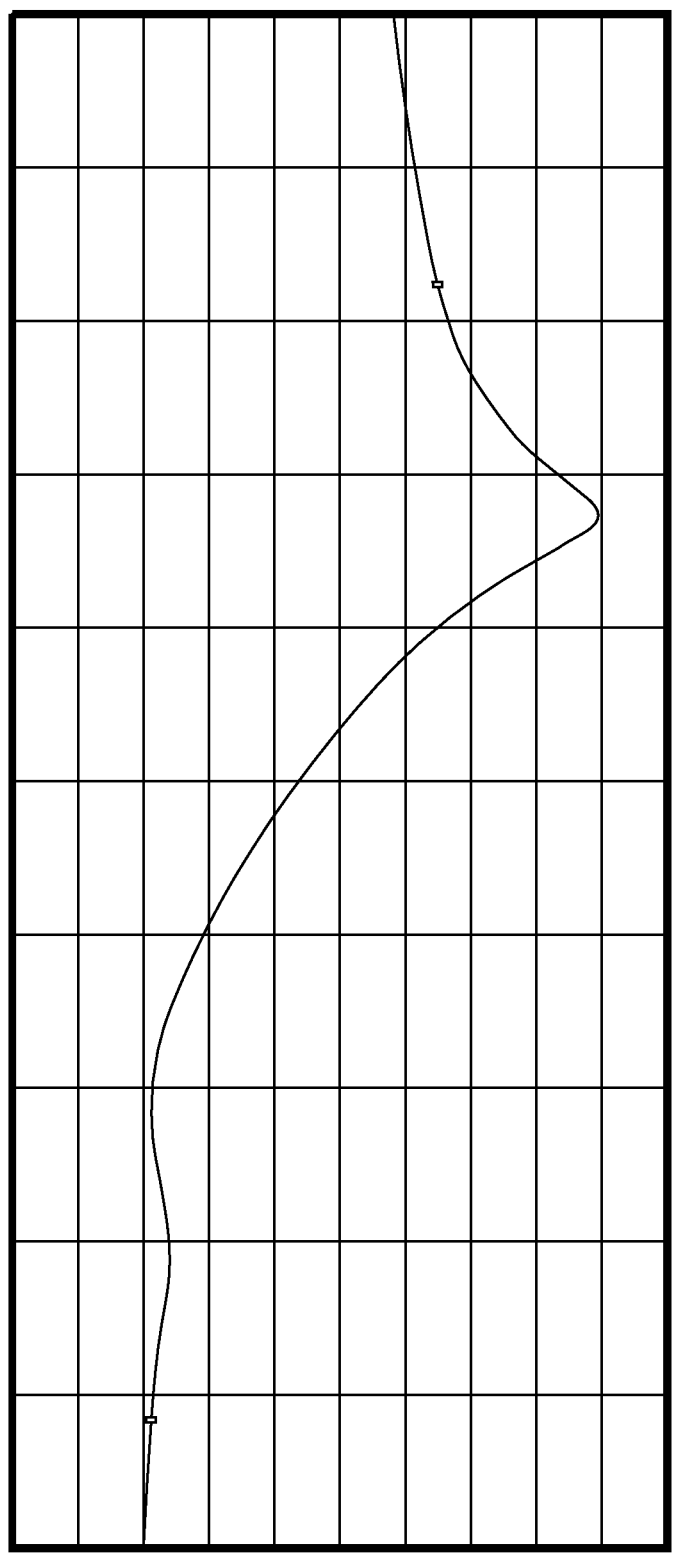
Figure 15:
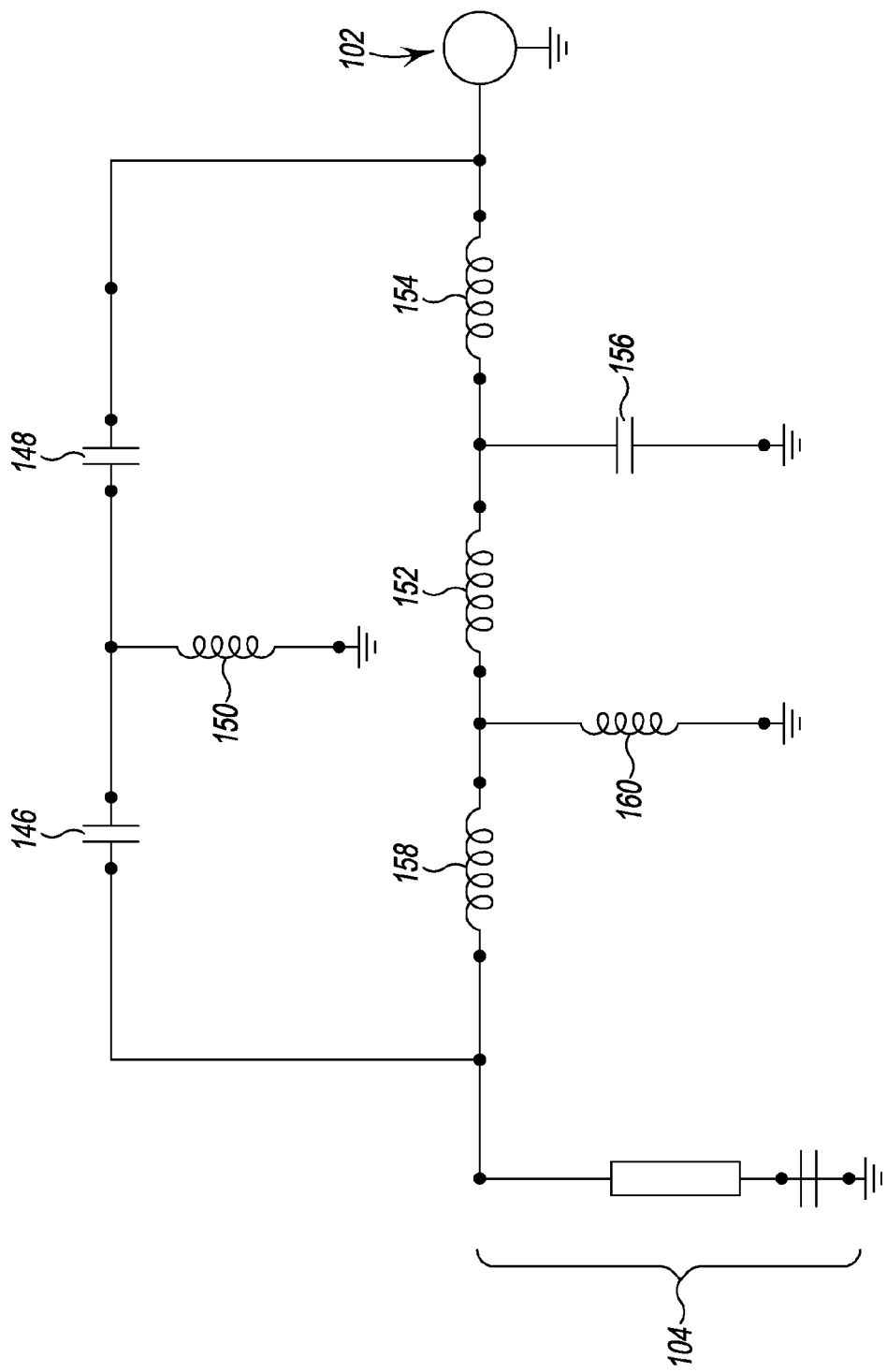
Figure 16:
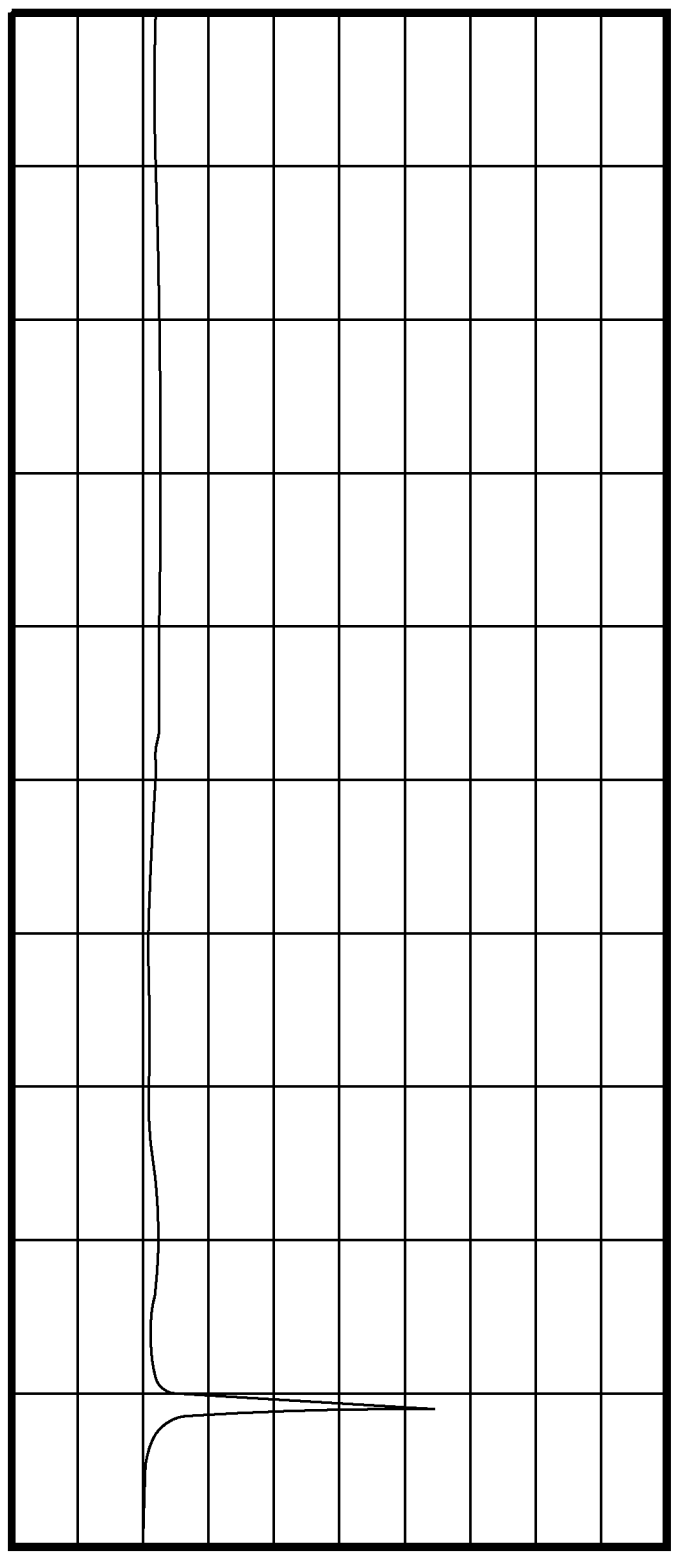

With reference to FIG. 10, the MAMP 130 includes a BNC (female) connector 132, a piece 136 of beryllium copper, an enclosure body 138, a BNC/F (male) connector 134 and a piece 140 of, for example, FR-4, PCB with two pins 142, 144 that couple to the center conductors of the BNC and F connectors 132, 134, to form the center conductors of the BNC and F connectors 132, 134. Assembly of the MAMP 130 is illustrated in FIG. 11. The illustrated MAMP 130 is a two port matched diplexer, in which a high pass filter comprising capacitors 146, 148 and inductor 150 provides a high frequency path to the SLM (FIG. 10) 102, and a low pass filter comprising an inductor 152, an inductor 154 and a capacitor 156 matched by an antenna impedance matching network comprising an inductor 158 and an inductor 160 to provide a low frequency path to the SLM 102 (FIG. 14). FIG. 13 illustrates the schematic of the MAMP 130 when the antenna 104 is receiving high (operating/resonant) frequency signal. At this frequency, the antenna's source impedance is about 50Ω. FIG. 14 illustrates the frequency response of the MAMP in the region of the resonant frequency of the antenna 104. FIG. 15 illustrates the schematic of the MAMP 130 when the antenna 104 is receiving the low frequency signal. At this frequency, the antenna's source impedance is about 3Ω in series with an approximately 18 pF capacitance. FIG. 16 illustrates the frequency response of the MAMP in the region of the low frequency signal.

Figure 17:
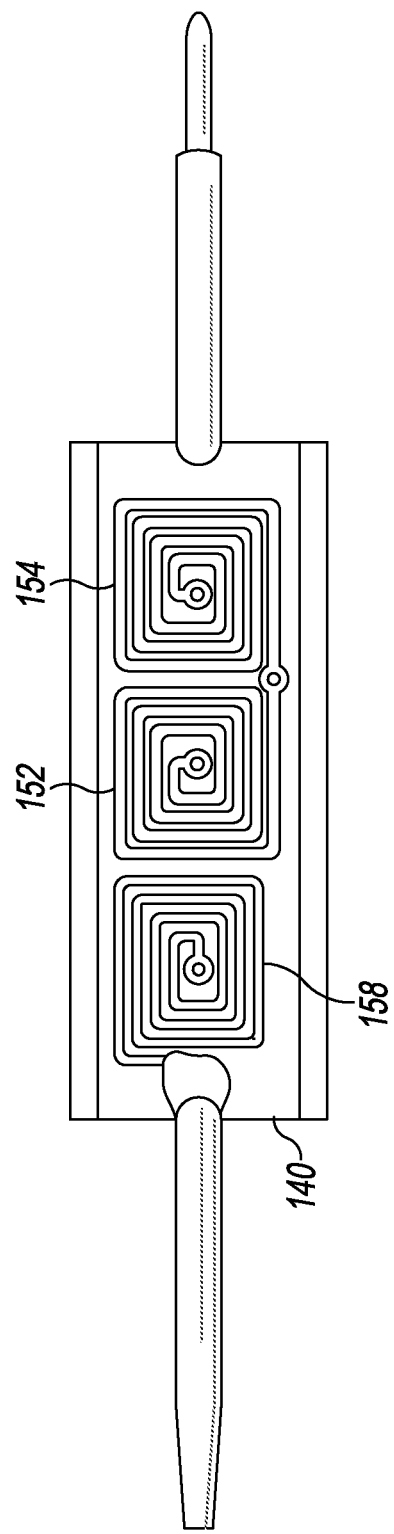
Figure 18:
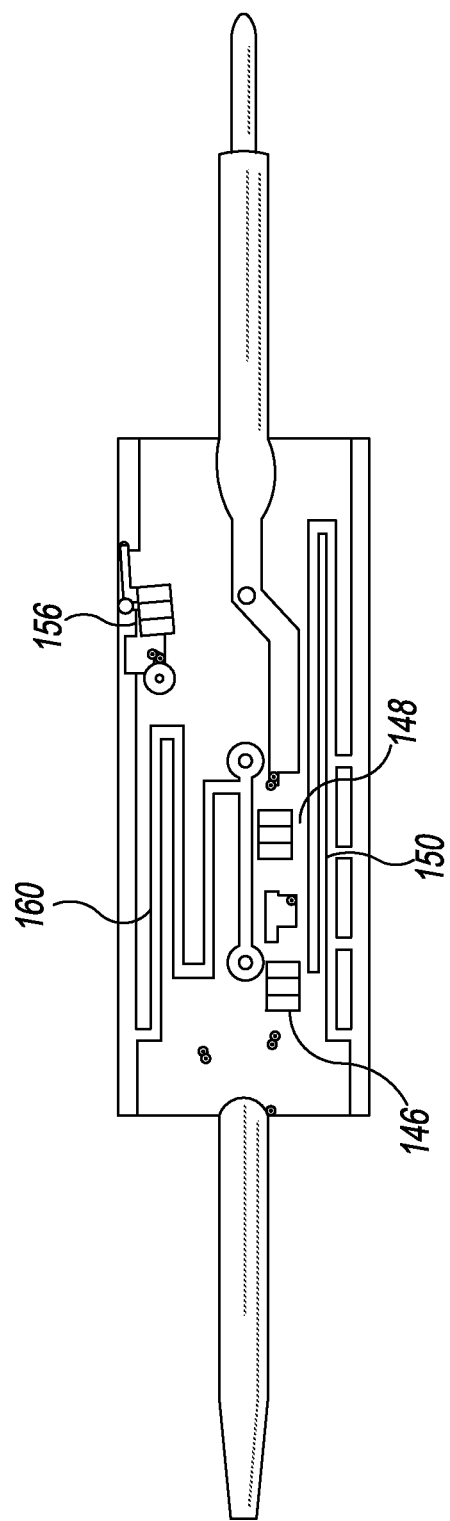

To make a reliable and inexpensive PCB assembly, the illustrated MAMP 130 PCB layout incorporates five printed inductors 150, 152, 154, 158 and 160 instead of coil inductors. As illustrated in FIG. 17, three printed inductors 158, 152, 154 of the LPF are on one side and a HPF 146, 148, 150, LPF capacitor 162 and a printed matching inductor 160 are on the other side (FIG. 18).

Among the advantages of the illustrated MAMP 130 are: one antenna 104 with MAMP 130 cars receive multiple frequencies; the MAMP 130 provides 10 to 15 dB higher antenna gain at low frequency; the MAMP 130 readily connects to the antenna 104 and the SLM 102 for leakage testing; MAMP 130 adapts the antenna 104's BNC connector 132 to the SLM 102's F connector 134; the MAMP 130 structure takes advantage of existing construction techniques that provide; simple, easy assembly and reliable operation; and, MAMP 130 PCB layout reduces cost; provides better performance and permits easier matching tuning.

The monopole antenna 104 is coupled via BNC connector 132 through series inductors 158, 152 and 154 and BNC/F connector 134 to the SLM 102. Inductor 160 is coupled between the common terminal of inductors 158 and 152 and SLM 102 ground. Capacitor 156 is coupled between the common terminal of inductors 152 and 154 and SLM 102 ground. The series combination of capacitor 146 and capacitor 148 is also coupled between the BNC connector 132 and the BNC/F connector 134. An inductor 150 is coupled between the common terminal of capacitors 146 and capacitor 148 and SLM 102 ground. When the low frequency is being measured, an additional capacitor is coupled between the antenna 104 and SLM 102 ground. In the previously discussed embodiment, in which the low frequency is about 138 MHz and the high frequency is about 757.5 MHz, the various component values may be, for example: 158 is about 46 nH; 160 is about 12.5 nH; 152 is about 40 nH; 154 is about 47 nH; L5 is about 12 nH; 156 is about 18 pF; 146 is about 5.1 pF; 148 is about 5.1 pF; and, the capacitor between the antenna and SLM ground is about 18 pF±2%.

In an illustrative embodiment, two CW test carriers at two frequencies are injected at the ground block with a defined relationship to the system levels at those frequencies. For example, if the normal operating system levels are +0 dBmV at the ground block 106, the technician connects the test generator to this point at +40 dBmV at both frequencies, for example, about 138 MHz (for example, about 139.25 MHz) and about 750 MHz (for example, about 757.5 MHz). This establishes a test signal level-to-system level relationship of 40 dB. These test signals propagate through the subscriber premises 100 in the same manner as the CATV signal, only at higher levels. Since these test levels are much higher, a very sensitive, and typically more expensive, SLM is not needed to detect the leakage. The economical SLM 102 includes a "rubber duck" antenna 104 frequency matched to capture the leakage as the SLM 102 is moved through the subscriber premises 100. The SLM 102 is programmed to automatically account for the antenna factor and the fact that the test signal is, for example, 40 dB above system level, and to convert the thus-adjusted readings to microvolts per meter (λV/m) for display on SLM 102.

One set of sensitivity tests with the system indicate leaks at about 138 MHz have a sensitivity of 1 μV/m @ 40 dB and 0.10 μV/m @ 60 dB. Leaks at about 750 MHz have a sensitivity in the range of 4 μV/m @ +40 dB and 0.40 μV/m at 60 dB. These sensitivity ranges permit technicians to find even very small leaks which are capable of causing ingress or egress in cable, active cable elements, passive cable elements and customer premises devices (hereinafter sometimes CPD) units. Although these sensitivities are high, they should be immune to most noise-generated false readings as the elevated readings are generally well above ambient noise levels. This data can be appended to the premises "health" or premises certification test data for a subscriber installation and uploaded to a permanent record of that installation in system management software, such as Trilithic Viewpoint™ software. In instances where a full SLM 102 is not needed, a leakage receiver for "leakage-only" applications can be used.

Further considering ingress into a premises cable plant, shielding defects in premises wiring systems and customer premises equipment or customer-provided equipment (hereinafter both sometimes CPE) have the potential to collect and intermingle terrestrial signals with the desired transmissions in the coax. There is typically a high correlation between these points of ingress and points of egress in the coaxial system, since a shielding defect works equally well to permit leakage into, or leakage from, the cable system. At typical digital signal levels in the Long Term Evolution (hereinafter sometimes LTE) band, leakage levels of 1 µV/m can indicate shielding defects that could capture signals from nearby LTE devices sufficient to create interference ratios of less than 30 dB, causing potential tiling of television displays or other interruption to the subscriber's services. Although not reflecting all variables, the illustrated system includes the capacity to approximate the leakage antenna "gain" (loss) from the premises cabling using the formula:

$$P_R = P_T - L_L + G_T - L_{fs} + G_R$$

where $P_T$=power of the injected CW carriers
$L_L$=loss in the coax and splitters to the point of the leak from the source
$G_T$=gain of the leakage antenna model
$L_{fs}$=free space attenuation from the leak to the instrument measurement antenna
$G_R$=gain of the instruments antenna in dBd
$L_f$=generally, the antenna is connected directly to the instrument (no loss), and
$P_R$=received power
Solving for $G_T$ yields $$G_T = P_R - P_T + L_L + L_{fs} - G_R$$

Thus, by knowing the received power (that is, the measured leakage power), the transmit power (that is, the +40 dB or +60 dB signal supplied by the carrier generator at the ground block), loss up to the location of the leak (approximated by the loss through the subscriber's interior cabling and flat loss from the ground block to the leak), free space attenuation (typically related to the distance from the leak to the rubber duck receive antenna, and calculated within the instrument), and the gain of the receive antenna (specified), the approximate gain of the leak model in dBd can readily be calculated. Once the approximate gain of the leak model has been calculated, estimate can be made of the effect of various other fields known to be present in the subscriber premises (for example, LTE fields) by applying these fields to the ingress antenna model and predicting the ratio of the desired (system carrier) to the undesired (tower or cell phone sourced signals). Problems may arise at locations where a cell tower is close (LTE downstream frequencies), or where a cellular device in the subscriber premises must transmit at high levels to reach the cell (LTE upstream frequencies).

Input level to the subscriber's in-premises distribution network is in the range of −5 dBmV. The cable is disconnected, for example, at the ground block, and a signal generator capable of producing at least two frequencies, for example, about 138 MHz and about 750 MHz at levels of, for example, about +40 dBmV (the default level) and about +60 dBmV, is coupled to the subscriber's in-premises network, again, usually at the ground block. Thus, the offset for the default +40 dBmV is +45 dB. The offset for +60 dBmV is +65 dB. In the subscriber network there may be some one or more sources of what is known as "flat" (that is, non-frequency dependent, non-distance dependent) loss, for example, (a) splitter(s), (a) tap(s) and so on. A four-way splitter might have a loss in the range of −7 dB. A tap might have a loss in the range of −3 dB. In addition, there is line loss for the length of coaxial cable between the ground block and a flaw or "leak" in the cable. This loss typically is frequency dependent and might be, for example, 6 dB/100 ft. (about 30.5 m) for about 138 MHz and 10 dB/30.5 m for about 750 MHz. Thus, the amount of loss is related to how far the leak is along the cable from the port at which the signal generator is coupled (again, typically, the ground block). Since the injected signal level amplitude is so high (+40 dBmV or +60 dBmV in the illustration), the exact numbers for the various losses are not so important as rough numbers and knowing what circuit element(s) is (are) between the injection port and the leak. For example, a technician might assume one four way splitter and no taps between the injection port and the leak. The leak "antenna" might be assumed to be a dipole radiator having a gain Gl dBd, and the measuring instrument's antenna may be a monopole having known characteristics, for example, a gain Gi dB. The technician is instructed to walk the distribution network through the subscriber premises at a distance of say 3 m from the wall.

According to an illustrative example, a technician disconnects the cable 106 at the subscriber's premises 100's ground block 208, where the cable 106 enters the premises 100 and is split in "tree and branch" topology into branches 210 running to different cable 106 outlets 212 within the premises 100. The technician then connects a dual oscillator 214, 216 to the ground block 208, and two signals, one in the aircraft band and one in the LTE band, are provided to the premises 100's internal cable 106 wiring 218. Illustrative signals are an approximately 139.25 MHz CW signal in the aircraft band and an approximately 750 MHz CW signal in the LTE band. These signals are provided at high levels. For example, if the cable 106 signal is provided to the ground block 208 at −5 to 0 dBmV, a not-atypical level, the dual oscillator 214, 216 provides 60 dBmV signals at the selected frequencies to die ground block 208 (so-called power offset is about +60 dB to about +65 dB). Of course, the dual oscillator 214, 216 must be well shielded to prevent the dual oscillator 214, 216 from radiating, and the SLM 102/antenna 104 combination from receiving, the selected frequencies radiated through the air from the oscillator 214, 216.

The technician walks around the premises 100 with his SLM 102/antenna 104 combination, which may be equipped with a GPS to track the technician's movements. The SLM 102/antenna 104 combination logs signal levels as the technician moves. Peaks in the leakage signal are readily apparent on the SLM 102's output, which may be analog (a meter or gauge) or digital (a digital display), if excessive leakage is detected, it can be traced from the log of readings and associated technician locations to (a) particular point(s)

in the premises 100's internal cable 218 wiring, fittings to output devices, etc., and directly and immediately addressed and repaired. Again, the equation governing this process is $$P_R = P_T L_L + G_T - L_{fs} + G_R$$

where $P_R$=received power (at the SLM 102/antenna 104) in dBmV;
$P_T$=transmitted power (at the dual oscillator 214, 216) in dBmV;
$L_L$=line loss in dB in the ground block 208 and the house 100's internal cabling 218;
$G_T$=gain in dBi of the transmitting antenna (the gain of the leak in dBi);
$L_{fs}$=loss in dB due to free space between the leak and the receiving SLM 102/antenna 104; and,
$G_R$=gain in dBi of the receiving antenna 104.

$P_R$, $P_T$, $L_L$, $L_{fs}$ and $G_R$ typically are known. Thus, $G_T$ can readily be calculated.

Analysis of SLM 102/antenna 104 measurement results permits, for example, the technician or a program running on a remote server 220 to which the collected data is provided to ascertain the location 222 and extent $G_T$ of the leak and generate a repair work order.

Analysis of the SLM 102/antenna 104 measurement also permits, for example, a program running on a remote server 220 to which the collected data is provided to ascertain the likelihood of interference from the premises 100 entering the cable 106 system through the leak 222 and disrupting other cable 106 services. For example, if a leak 222 is large ($G_T$ large) and the subscriber uses a cell phone 224 or like device in the premises 100, such a program can predict with reasonable accuracy the likelihood of cell phone 224 interference with cable 106 signals provided to terminal equipment 226, such as televisions, computers and the like, in the premises 100.

Analysis of the SLM 102/antenna 104 measurement can also provide a reasonably accurate indication of isolation. For example, if the injected signal at the ground block 208 is at +60 dBmV and a −40 dBmV signal level is read at the SLM 102/antenna 104, the cable 106 provider may reasonably infer that 100 dB of isolation exists between the cable 106 system and the premises 100 at the SLM 102/antenna 104-to-cable 218 measurement distance, for example, about 10 feet (about 3 m).

The SLM 102/antenna 104 measurement can also be used for workforce management and analysis. The measurement, will be returned, for example, by DOCSIS, WiFi and/or like utilities to (a) server(s) 220 operated by the cable 106 system operator, or to whose services the cable 106 system operator subscribes. Here, the measurement(s) will be entered into the subscribers file, along with the time(s) the measurement (s) was/were made, subscriber location/identity, information about, when a work order was filled, and so on.

Information thus collected can also be entered into a management information base to provide alerts concerning the status of the various components of the cable 106 plant.

In an example, at a frequency of about 757.5 MHz, $P_R$=−40.00 dBmV; $P_T$+60 dBmV; $L_L$=15 dB; $L_{fs}$=39.73 dB; and, $G_R$=2 dBi. Again, $P_R = P_T - L_L + G_T - L_{fs} + G_R$. Thus, $G_T$=−47.27 dBi. If the actual reading at the SLM 102 is −40 dBmV (corresponding to 162.76926 µV/m at the SLM 102), and the power offset is 65 dB, the adjusted received power is (−40−65) dBmV, or −105 dBmV corresponding to a "corrected" leakage of 0.09 µV/m.

On the interference side, if a cell phone 224 producing a field strength of 1.8 V/m (about 40.87 dB at the SLM 102) is positioned about 3 m (about 10 ft.) from the leak 222 (the transmitting antenna), $L_{fs}$=39.73 dB (that is, the loss between the cell phone 224 and the leak 222 is 39.73 dB) and the leakage antenna gain, $G_T$−47.27 dBi, the cell phone 224 signal has a strength at the leak of about −46.14 dBmV. Since the system level is −5 dB, the interference ratio (−5 dB−(−46.14 dB)) is about 41.14 dB.

The SLM 102 includes a gauge, dial or display for each of the frequencies of interest, for example, about 139.25 MHz and about 750 MHz. All of the above calculations for each frequency are performed by an arithmetic module in the SLM 102. The results are output to the gauge, dial or display for each frequency.

What is claimed is:

1. A method for determining a magnitude of leakage in a subscriber's premises Cable Television (CATV) installation comprising:
   disconnecting a CATV network at a suitable network port;
   securing an apparatus including a frequency source to the suitable network port to wiredly connect the apparatus to cable wiring in the subscriber's premises and so that a high power offset is maintained;
   shielding the frequency source to prevent a signal level meter or leakage receiver from receiving radiated frequency source oscillations;
   transporting a signal level meter or leakage receiver around the subscriber's premises; and,
   outputting by the signal level meter or leakage receiver signal levels measured by the signal level meter or leakage receiver as the signal level meter or leakage receiver is transported,
   wherein securing the apparatus including the frequency source to the suitable network port so that a high power offset is maintained includes generating an output signal at a level in a range of 40 dB to 70 dB above a signal level provided by the CATV network so that the high power offset is maintained and supplying the output signal through the suitable network port to the cable wiring in the subscriber's premises,
   wherein the signal level provided by the CATV network is in a range of −5 dBmV to 0 dBmV and outputting by the signal level meter or leakage receiver includes displaying the signal levels on a display screen.

2. The method of claim 1 further comprising subtracting the high power offset from the signal level provided by the CATV network, converting a result to field strength and displaying a resulting field strength on the signal level meter or leakage receiver.

3. The method of claim 1 wherein disconnecting the CATV network at the suitable network port comprises disconnecting the CATV network at a ground block of the subscriber's premises.

4. The method of claim 1 wherein securing the apparatus including the frequency source to the suitable network port comprises coupling a dual oscillator to the suitable network port.

5. The method of claim 1 further including addressing excessive signal levels in response to the signal levels measured by the signal level meter or leakage receiver.

6. The method of claim 1 wherein outputting by the signal level meter or leakage receiver signal levels measured by the signal level meter or leakage receiver as the signal level meter or leakage receiver is transported comprises calculating $G_T$ from the equation $$P_R = P_T - L_L + G_T - L_{fs} + G_R$$

where $P_R$=received power in dBmV;
$P_T$=transmitted power in dBmV;

$L_L$=line loss in the suitable network port and an internal cabling of the subscriber's premises;

$G_T$=gain in dBi of a transmitting antenna;

$L_{fs}$=loss in dB attributable to a space between the leakage and a receiving antenna; and, $G_R$=gain in dBi of the receiving antenna, and outputting an indication of $G_T$.

7. A method for monitoring leakage in a subscriber's premises, the method comprising:

disconnecting a Cable Television (CATV) network from a suitable network port at the subscriber's premises, attaching an apparatus including a frequency source to the suitable network port to wiredly connect the apparatus to cable wiring in the subscriber's premises, shielding the frequency source to prevent a signal level meter or leakage receiver from receiving radiated frequency source oscillations, energizing the frequency source to generate an output signal greater than a signal level provided by the CATV network, the signal level provided by the CATV network being in a range of −5 dBmV to 0 dBmV, supplying the output signal through the suitable network port to the cable wiring in the subscriber's premises, transporting a signal level meter or leakage receiver around the subscriber's premises, and outputting by the signal level meter or leakage receiver an indication of signal levels measured by the signal level meter or leakage receiver, wherein energizing the frequency source to generate an output signal greater than the signal level provided by the CATV network includes generating the output signal at a level in a range of 40 dB to 70 dB above the signal level provided by the CATV network.

8. The method of claim 7, wherein the outputting by the signal level meter or leakage receiver the indication of signal levels measured by the signal level meter or leakage receiver includes displaying the signal levels.

9. A method for monitoring leakage in a subscriber's premises, the method comprising:

disconnecting a Cable Television (CATV) network from a suitable network port at the subscriber's premises, the CATV network being operable to provide a signal level in a range of −5 dBmV to 0 dBmV, securing an apparatus including a frequency source to the suitable network port to wiredly connect the apparatus to cable wiring in the subscriber's premises, the frequency source being shielded to prevent transmission of radiated frequency source oscillations, energizing the frequency source to supply an output signal through the suitable network port to the cable wiring in the subscriber's premises, the output signal being at a level in a range of 40 dB to 70 dB greater than the signal level provided by the CATV network, transporting a signal level meter or leakage receiver around the subscriber's premises, and outputting by the signal level meter or leakage receiver an indication of signal levels measured by the signal level meter or leakage receiver.

\* \* \* \* \*